United States Patent [19]

Gochi

[11] Patent Number: 5,055,661
[45] Date of Patent: Oct. 8, 1991

[54] IC CARD WITH SWITCHABLE BUS STRUCTURE

[75] Inventor: Hidenobu Gochi, Itami, Japan

[73] Assignee: Mitsubishi Denki Kabushiki Kaisha, Tokyo, Japan

[21] Appl. No.: 398,957

[22] Filed: Aug. 28, 1989

[30] Foreign Application Priority Data

Aug. 29, 1988 [JP] Japan .............................. 63-212547

[51] Int. Cl.$^5$ .......................................... G06K 19/06
[52] U.S. Cl. .................. 235/492; 364/240.3; 365/189.02
[58] Field of Search ................ 235/492; 365/238.5, 365/189.02, 230.02; 364/240.3

[56] References Cited

U.S. PATENT DOCUMENTS

| | | | |
|---|---|---|---|
| 4,001,550 | 1/1977 | Schatz | 235/492 X |
| 4,309,754 | 1/1982 | Dinwiddie, Jr. | 364/200 |
| 4,447,878 | 5/1984 | Kinnie et al. | 364/200 |
| 4,514,808 | 4/1985 | Murayama et al. | 364/200 |
| 4,683,534 | 7/1987 | Tietjen et al. | 364/200 |

FOREIGN PATENT DOCUMENTS

0217479 4/1987 European Pat. Off. .
2021823 12/1979 United Kingdom .

Primary Examiner—David Trafton
Attorney, Agent, or Firm—Leydig, Voit & Mayer

[57] ABSTRACT

An IC card with a bus structure switchable between a narrow bus mode (such as an 8 bit bus) and a wide bus mode (such as a 16 bit bus). A plurality of memories are provided (in the example preferably 8 bit memories). Addresses are coupled to the IC card for activating the memories in parallel when in the wide bus mode or in selectable sequence when in the narrow bus mode. The data lines of the memories are connected by bus switching means to couple the memory data lines to the output bus so that data exchange is in parallel between both of the memories and the 16-bit bus in the wide bus mode, and is between individual ones of the memories and only the 8-bit bus in the narrow bus mode. The result is efficient use of both semiconductor memories in both the wide bus and narrow bus modes, with automatic switching between modes on the IC card in dependence upon a logic signal derived from the external terminal which defines the mode in which the IC card is intended to operate.

9 Claims, 5 Drawing Sheets

IC CARD WITH SWITCHABLE BUS STRUCTURE

FIELD OF THE INVENTION

This invention relates to IC cards, and more particularly to an IC card with onboard memory for exchanging data with an external terminal.

BACKGROUND OF THE INVENTION

IC cards are known and, as a feature, carry an onboard semiconductor memory which can exchanged data with an external terminal. The word "terminal" is used in the generic sense to include any external device capable of exchanging data with the semiconductor memory of an IC card at addressed locations in that semiconductor memory.

Insofar as the present invention is concerned, the invention has broadest applicability to the type of IC card known as the memory card which does not include an onboard microprocessor. With non-microprocessor based memory cards, the external terminal is directly involved in generating addresses for the onboard IC card memory and for exchanging data with the addressed memory locations. However, as will become apparent to those skilled in this art upon reading of the following detailed description, in its broadest aspects the invention has applicability to microprocessor-based IC cards (sometimes called smart cards), particularly those where the external terminal has a significant function in determining where in the onboard memory particular items of data are to be stored.

IC cards and the associated external terminals have been configured with various bus structures compatible both with the processors in the terminals and the memory devices on the cards. For example, it is not unusual to have an IC card with a semiconductor memory on board which has an 8-bit data bus, and to configure the external terminal to exchange 8-bit data words with that memory. IC cards with 16-bit bus structures are also known, and 32-bit structures can be configured when the data storage requirements warrant that greater length of data word.

Use of IC cards has also progressed toward multiple-function cards where the same IC card is intended for use in a variety of external terminals. However, problems can arise when the bus structure of the IC card is incompatible with the bus structure expected by the external terminal. Thus, it is common to limit the use of 8-bit data bus IC cards to 8-bit terminals, 16-bit cards to 16-bit terminals, and the like.

Figure 1:
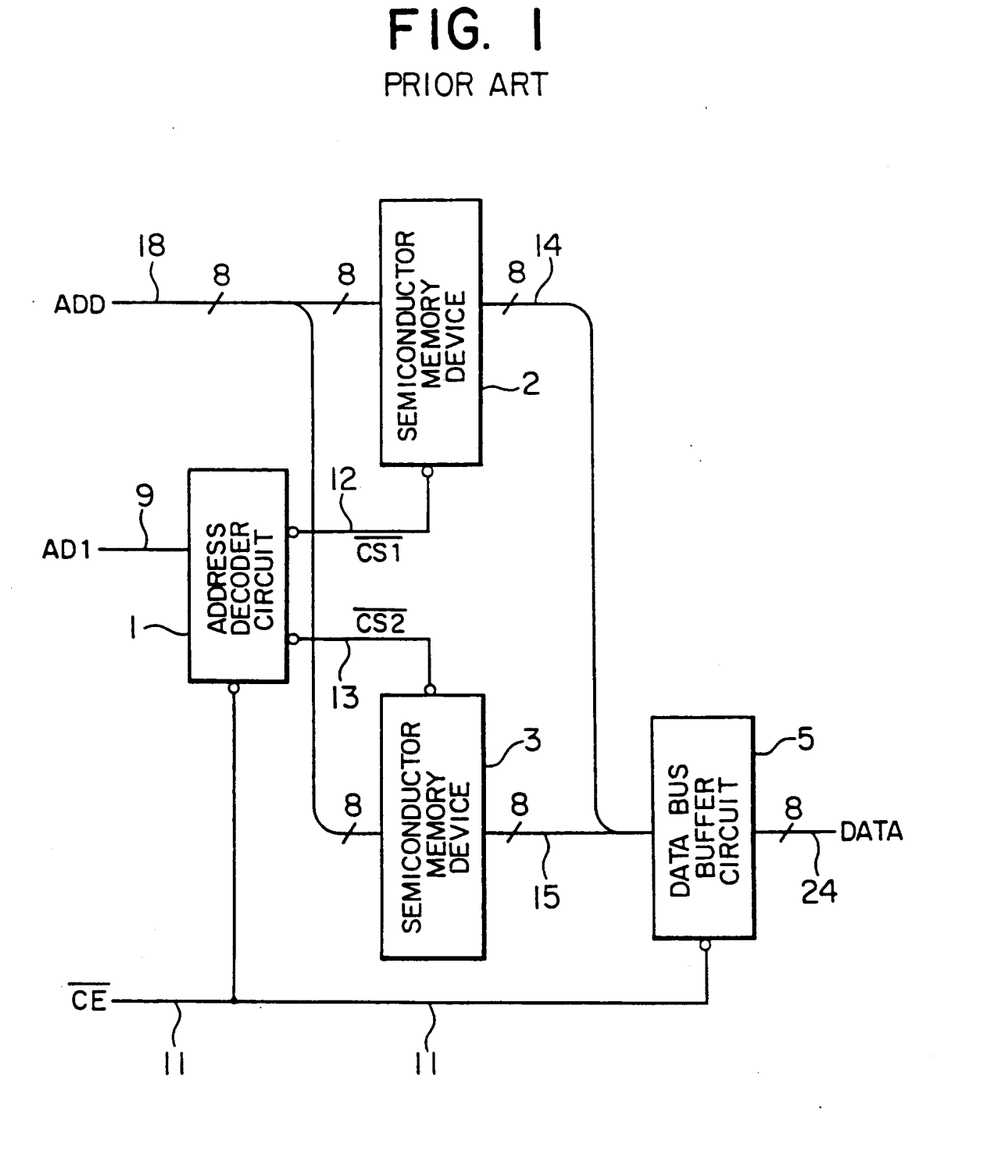
FIG. 1 is a block diagram showing the internal structure of a conventional IC card configured with an 8-bit data bus.
Figure 2:
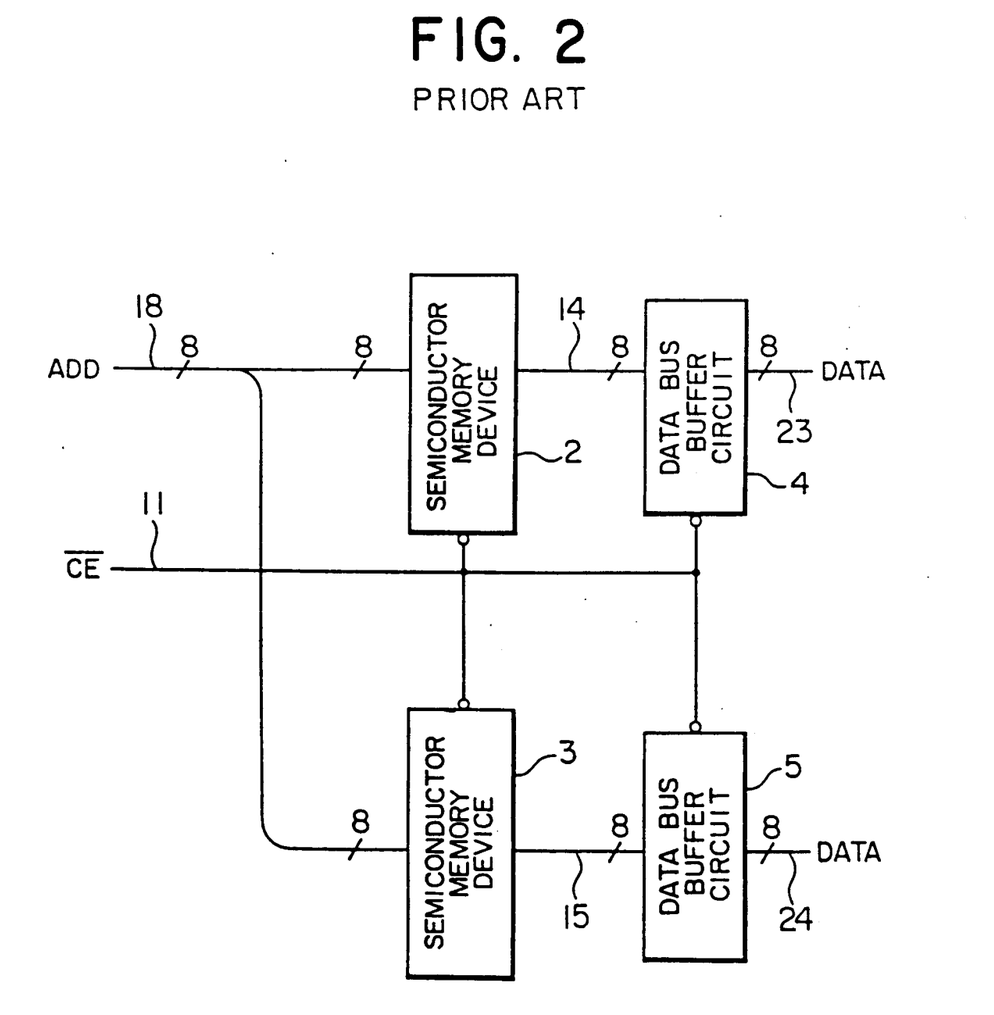
FIG. 2 is a block diagram showing the internal structure of an IC card configured with a 16-bit data bus.

FIGS. 1 and 2 are block diagrams illustrating the internal structure without input/output, and certain control circuitry) of known 8-bit data bus and 16-bit data bus IC cards, respectively. It will be appreciated from an examination of these figures and from the following description that the cards are each particularly suited to function with 8-bit or 16-bit terminals, respectively, and that the cards are not interchangeable for use in terminals for which they are not designed.

Referring first to FIG. 1, there is shown an IC card especially configured for exchange of 8-bit data words. It is noted that FIG. 1 shows primarily the semiconductor memories and devices which control and interface with those memories in exchanging addressable data words with the external terminal. Additional interfacing circuitry, serial-to-parallel and parallel-to-serial converters, and the like are also utilized as is well known to those skilled in the art, but are not shown in the drawings. The drawings also omit circuitry for some of the control functions (such as read/write control) which are not necessary for an understanding of the present invention. Only the devices immediately associated with the memories and bus structure control are described herein in order to direct focus to the instant invention.

The IC card of FIG. 1 includes a pair of semiconductor memories 2, 3 which interface through a data bus buffer circuit 5 to an external data bus 6. The data bus 6 in turn couples 8-bit data words between the memory devices 2, 3 and the input/output circuitry of an external terminal (not shown). While data bus 6 is shown as a single line, it is illustrated by the slash mark shown thereacross that it is actually an 8-bit bus. For the purpose of addressing individual words within the memory devices 2, 3, an address bus generally indicated at 8 is provided for coupling address signals to the semiconductor memory and thereby addressing individual word locations in the memory. In the FIG. 1 embodiment, the address bus 8 is comprised of a high level or most significant address portion 9 (in the example only a single bit) and a low level or least significant address portion 10 (in the illustrated embodiment of 8 bits). It is seen that the low order address bus 10 is coupled to the address lines of both of the semiconductor memories 2, 3 for addressing individual words in those memories. The high order address signal is coupled to an address decoder circuit 1 which has a pair of outputs 12, 13 driving chip select lines $\overline{CS1}$, $\overline{CS2}$ of the respective memory devices 2, 3.

In operation, when the high order address on bus 9 is high, the outputs 12, 13 of the address decoder circuit 1 produce a low $\overline{CS1}$ signal and a high $\overline{CS2}$ signal. As a result, the semiconductor memory 2 is enabled while the semiconductor memory 3 is disabled, e.g., the data lines of the memory 3 are in a high impedance standby state. Thus, the semiconductor memory 2 will respond to the lower order bits on bus 10 and will allow the addressed word in the semiconductor memory 2 to be read or written under the control of additional control circuitry (not shown). Data which is written into or read out of the memory at the addressed location is coupled thereto via the data bus buffer circuit 5 via internal data bus 14.

It is seen that the internal data lines of the semiconductor memories (8-bits in each case in the example) which appear on internal data buses 14, 15 are connected in common and coupled to the same data bus buffer circuit 5. The semiconductor memory devices can have outputs in the form of tristate circuitry such that the internal data lines can be connected in common as illustrated and only the enabled memory (i.e, the memory enabled by the appropriate chip select signal) will control the state of the common data bus (in the read operation) or will be controlled by state of the common data bus (in the write operation).

It is also seen that the IC card of FIG. 1 includes a card enable signal coupled onto the card by means of signal line 11, and that the card enable signal is coupled both to the address decoder circuit 1 and the data bus buffer circuit 5. Thus, when the card enable signal $\overline{CE}$ is driven low (either by additional circuitry on the IC card or by means of a signal from the external terminal), the address decoder circuit 1 is enabled to respond to the high order bit on line 9, and the data bus buffer circuit 5 is enabled to couple signals between the external data bus 6 and the data lines 14, 15 of the semiconductor memory devices 2, 3.

By virtue of the selectability achieved by the high order address on line 9, the semiconductor memories 2, 3 are never enabled together, and operate separately and independently, even though they are driven by the same low order address bus. Whenever an address is coupled onto the address bus 8 which has a low signal in the high order bit on line 9, only the semiconductor memory device 3 will respond to the low order address bits to exchange data with the external data bus. In contrast, when the high order address on line 9 is high, only the semiconductor memory device 2 will respond to the low order address bits to exchange data with the external terminal. Since the data lines of both semiconductor devices are coupled in parallel through the same data bus buffer circuit, both of the devices read and write information into the same external data bus for coupling to the external terminal on that single 8-bit data bus.

FIG. 2 illustrates an IC card particularly configured for use in a system which requires a 16-bit data bus. As in the FIG. 1 embodiment, a pair of semiconductor memory devices 2, 3 are provided. However, in contrast to the prior embodiment, separate data bus buffer circuits 4, 5 are provided for driving separate sections 7a, 7b of an extended data bus 6. As in the prior embodiment, an 8-bit address bus 10 is coupled in parallel to both semiconductor memory devices 2, 3. However, there is no independent enablement of the memory devices 2, 3; instead, they are enabled together for writing into or reading out of in parallel, and the separate data bus buffer circuits 4, 5 for the respective memory devices 2, 3 facilitate that operation.

The card enable signal coupled to the card enable line 11 is shown to enable both semiconductor memory devices 2, 3 at the same time. In addition, that same signal enables data bus buffer circuits 4, 5 so that the data lines of the memories 2, 3 are coupled to respective portions 7a, 7b of the 16-bit data bus 6 to exchange 16-bit words with the external terminal. Thus, when the card is enabled and address signals are coupled to the memory devices via address bus 10, corresponding words are addressed in each of the memory circuits 2, 3. Since the external data bus is comprised of two sections 7a, 7b and each has its own data bus buffer circuit 5, 4, data on the respective bus sections is coupled to the individual data lines 14, 15 of the respective memory devices 2, 3 for writing into the memory devices in the write mode or reading out of the memory devices in the read mode. Thus, the memory devices 2, 3 are operated in parallel, and data words on the data lines 14, 15 are exchanged with a 16-bit external data bus 6 under control of signals on the address bus 10 in order to read out or write in 16-bit words in contrast to the 8-bit words utilized by the card of FIG. 1.

It will be appreciated that additional increments of bus structure can be provided, dependent upon the design requirements of the system, and the 8-bit and 16-bit systems of FIGS. 1 and 2 are merely exemplary. In some cases, 4-, 8- or 16-bit buses might be utilized, in other cases, 32-bit buses. It is typical, however, to configure the basic bus size to be of N bits, and bus sizes of ever-increasing complexity to be an integral number of N bits, most typically an integral number which is $2^n$, i.e., 2, 4, 8, etc.

It will also be appreciated, however, that even though there is such a relationship between relatively simple bus structures of few bits and more complex bus structures (more complex in that they can carry more information per addressed data word), there is no opportunity to utilize an IC card designed to operate with a given bus size in a terminal designed for a different bus configuration.

SUMMARY OF THE INVENTION

In view of the foregoing, it is a general aim of the present invention to provide an IC card which is more universal in the sense that it contains a bus structure which is switchable between at least two modes.

In that regard, it is an object of the present invention to provide an IC card having a memory structure with multiple connections for the data lines of the memories switchable between at least two modes in which one mode provides a data bus structure of N bits and a second mode provides a different data bus structure of xN bits where x is an integer.

According to a particular aspect of the invention, it is an object to respond to a signal produced by a terminal in which an IC card is inserted to automatically configure the data bus structure of the IC card in accordance with the bus structure expected by the terminal.

In accordance with the invention, there is provided an IC card having an address bus and a data bus for exchanging information with an external terminal. The IC card has an improved memory structure which is switchable between a narrow bus mode and a wide bus mode. The IC card incorporates a plurality of N bit memories, each having address lines and data lines. An address decoder is also incorporated in the IC card and serves to selectively cause the memories to respond to address signals on their address lines together in the wide bus mode or separately in the narrow bus mode. Data bus switching means are also provided for controlling the coupling of data signals between the data lines of the memories and the narrow or wide bits of the data bus depending on the bus mode. Mode control means in the IC cards determine the bus structure required for use with a particular external terminal and enable the narrow bus mode or the wide bus mode for coupling the data signals between the onboard memory and the external terminal in the appropriate narrow or wide bus mode.

In the preferred practice of the invention, there is provided means for sensing the bus structure required by the external terminal and enabling the narrow or wide bus mode in dependence upon the bus structure demanded by the terminal. Also in the preferred practice of the invention, the N bit memories are operated in parallel in the wide bus mode to transfer data between the data lines of the memories and the wide bus, and individually in the narrow bus mode to transfer data between the data lines of individual ones of the N bit memories and only the narrow section of the output data bus.

The invention also includes corresponding method aspects in which an IC card has a plurality of semiconductor memories, and those memories are enabled in parallel or individually and the data lines are coupled to an output data bus in respective wide or narrow bus modes for operating the same memories in a single IC card in a dual bus mode.

Other objects and advantages will become apparent from the following detailed description when taken in conjunction with the drawings, in which:

While the invention will be described in connection with certain preferred embodiments, there is no intent to limit it to those embodiments. On the contrary, the intent is to cover all alternatives, modifications and equivalents included within the spirit and scope of the invention as defined by the appended claims.

DETAILED DESCRIPTION OF THE PREFERRED EMBODIMENTS

Figure 3:
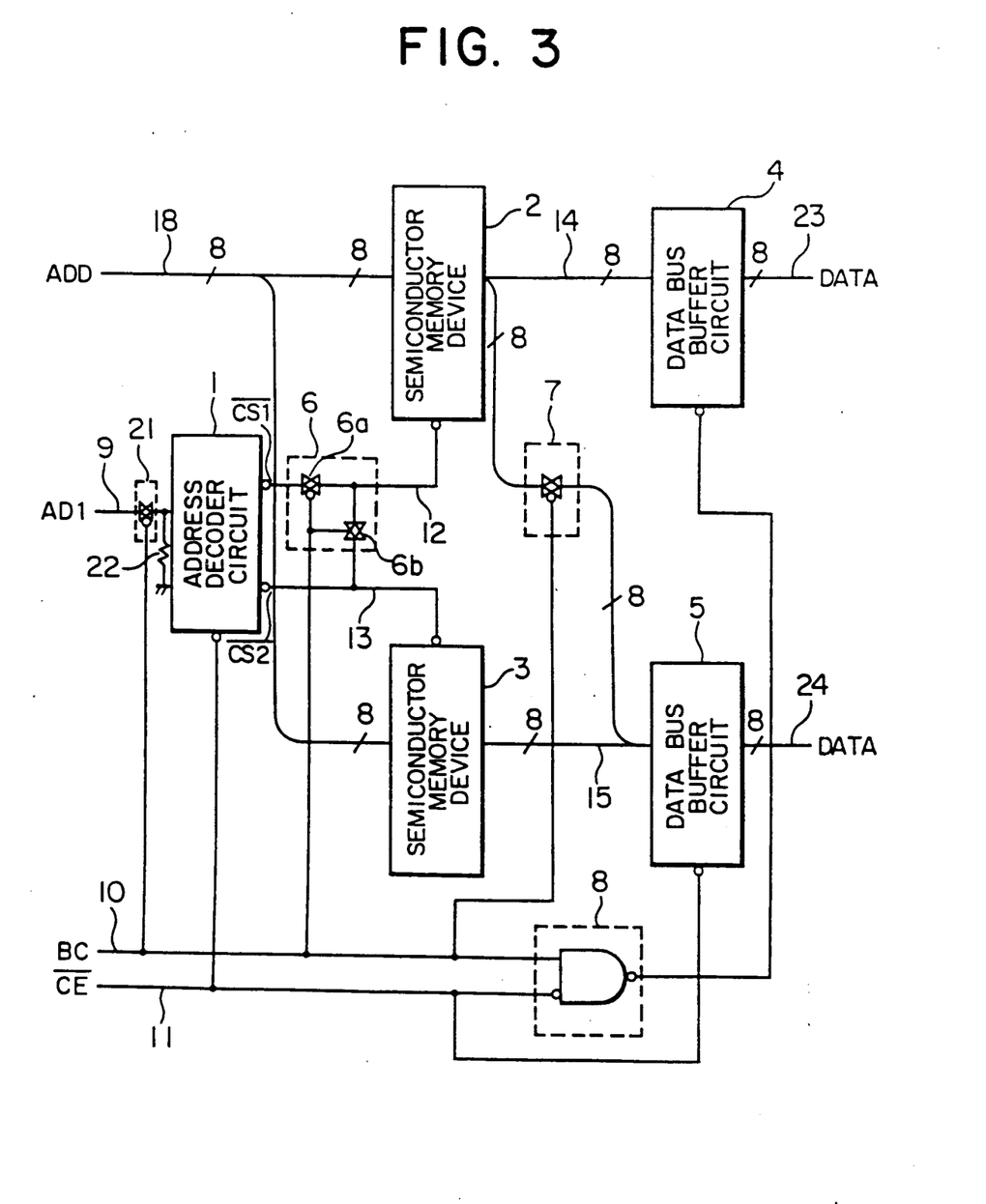
FIG. 3 is a block diagram showing the internal structure of an IC card exemplifying the present invention and having a switchable data bus of N and 2N bits.

Turning now to the drawings, FIG. 3 shows an IC card incorporating a multiple-width switchable data bus structure exemplifying the present invention. As in the prior embodiments, the IC card includes a plurality of semiconductor memories, in the present instance two semiconductor memories 52, 53. It is seen that the semiconductor memories 52, 53 have address lines (shown as 8-bit buses) which are coupled together and to an address bus 60. The address bus 60 represents the lower order bits of a composite address bus 58. Similarly, the semiconductor memories 52, 53 have data lines illustrated at 64, 65, respectively, and those data lines are connected for operation in two modes, namely, a narrow bus mode and a wide bus mode. To that end, the data lines 64, 65 are coupled to respective data bus buffer circuits 54, 55 so that when the semiconductor memories are operated in the parallel mode, the eight data lines from each of the semiconductor memories are brought out to both sections 57a and 57b comprising the wide data bus 56 to serve as a 16-bit data bus.

In practicing the invention, switch means are provided for reconfiguring the data bus to a narrow bus mode, in the illustrated embodiment, an 8-bit mode. As shown in FIG. 3, such switch means include an array of bilateral switches 70 which take the data lines of the respective semiconductor memories 52, 53 which form a pair of separate N bit data buses and connect them together in parallel to form a single N bit data bus. That single N bit data bus is connected to only one of the data buffer circuits, in the illustrated embodiment buffer circuit 55, such that the data lines of the respective memories 52, 53 can exchange information with the narrow bus bits 57a of the switchable data bus 56.

Also as an element of the switchable bus structure, in practicing the invention, address decoder means are provided for selectively causing the memories 52, 53 to respond to address signals on their address lines together in the wide bus mode or individually in the narrow bus mode. To that end, in the embodiment illustrated in FIG. 3, separate switch means are provided at the input and the output of the address decoder circuit 1, such switch means being illustrated at input switching means 71 which connects the high order line 59 of the address bus 58 to the input of the address decoder circuit, and output switching means 72 which interconnects the chip select lines of the address decoder with the enable lines of the respective semiconductor memories 52, 53. Thus, input switching means 71 is interconnected between the high order address line 59 and the input of the address decoder circuit. When the input of that switch is at a low level, the switch 71 is open and, by virtue of sink resistor 74, the address decoder is maintained with the $\overline{CS1}$ output high and the $\overline{CS2}$ output low. In the alternate condition, with the input of the switch 71 in the low level, the switch 71 is closed and allows the address decoder circuit 51 to respond to the high or low level of the high order bit on line 59 as in the FIG. 1 embodiment.

The output switch means 72 includes separate switching elements 72a, having a control input responsive to a logic low bus control signal BC, and outputs interconnecting the $\overline{CS1}$ output of address decoder circuit 51 to the enable input of semiconductor memory 52. The switch means 72 also has a second switching element 72b which responds to a logic high bus control signal BC to interconnect the chip select inputs of the memories 52, 53 together and to the $\overline{CS2}$ output of address decoder circuit 51. In the narrow bus mode, the switch 72a is closed and the switch 72b is open such that the address decoder circuit 51 functions to alternately or separately energize the semiconductor memory devices 52, 53 in dependence upon the logic state of the high order bit on address line 59. In the wide bus mode, switch 71 is open which forces the $\overline{CS2}$ output low. In addition, switch element 72a is open which in effect disconnects the $\overline{CS1}$ output of the address decoder circuit, and switch element 72b is closed which couples the low signal on $\overline{CS2}$ to both of the enabling inputs of semiconductor memories 52, 53 so that they can respond in parallel.

A final element of enabling circuit is illustrated at 75 and includes a gate having a first input driven by the card enable signal 61 and a second input driven by a bus control input 76. Thus, when the IC card is enabled as evidenced by a low signal on $\overline{CE}$, and the bus control line is high which signifies the wide bus mode, the gate 75 is satisfied, producing a low output which is coupled to data bus buffer circuit 54 enabling that circuit. That in conjunction with the low signal which is applied directly to buffer circuit 55 by the $\overline{CE}$ signal on line 61 serves to energize both data bus buffer circuits 54, 55 at the same time, thus allowing coupling of data signals between the semiconductor memories 52, 53 and the wide data bus 57a, 57b in the wide bus mode.

Summarizing the operation of the IC card circuit of FIG. 3, attention will first be directed to the narrow bus mode. In the narrow bus mode, the external terminal applies signals to the IC card which cause the card enable signal $\overline{CE}$ on line 61 to be low and the bus control signal BC on line 76 to also be low. As a result, the input switch means 71 connected at the input of the address decoder circuit 51 is closed which couples the high order address bits from line 59 to the address decoder circuit 51. Thus, the logic levels of $\overline{CS1}$ and $\overline{CS2}$ at the output of the address decoder circuit are controlled by the logic level of the high order address bit on line 59. In a fashion similar to that described in connection with the circuit of FIG. 1, the high order address will alternately and individually enable semiconductor memories 52 or 53. In the illustrated embodiment, the semiconductor memory 52 is enabled when the high order bit on line 59 is high, and the semiconductor memory 53 is energized whenever the logic level of the high order bit on line 59 is low. The direct connection between the $\overline{CS2}$ output of decoder 51 and the enabling input of memory 53 couples the signals between those elements. The closed nature of switch 72a (as determined by the low logic level coupled to the BC line 76 couples the $\overline{CS1}$ signals to the enabling input of the semiconductor memory 52.

Thus, the semiconductor memories are enabled to individually respond to address signals on the low order address bus 60 separately in the narrow bus mode. The data lines of the semiconductor memory are also especially configured in the narrow bus mode so that all data is transferred between the narrow bus 57a and whichever of the semiconductor memories 52, 53 are enabled. Thus, the low signal coupled to the bus control input 76 closes switch 74 and thus connects the data lines of the semiconductor memories 52, 53 to the single data bus buffer circuit 55 and thence to the narrow N bit bus 57a. It is seen that the data bus buffer circuit 55 is enabled by the low logic level applied to card enable line 61 and thus data words on the output bus 57a are transferred between that bus and whichever of the memories 52, 53 are enabled by the high order bit of the address signal. The output of gate 75 is high due to the low logic level applied to BC line 76 and thus the data bus buffer circuit 54 is maintained in the disabled condition and the high order bits of the data bus on bus section 57b remain inactive.

In the wide bus mode, the logic level applied to bus control line 76 is high and that has several results both in the addressing circuitry and in the data bus switching circuitry. First of all, the high signal applied as a switching input to switch 71 opens that switch and allows sink resistor 74 to apply a low signal to the input of address decoder circuit 51 thus forcing the $\overline{CS2}$ output of address decoder circuit 51 to the low level. The high output applied to the bus control line 76 opens switch 72a which disconnects the $\overline{CS1}$ output from the enabling input of semiconductor memory 52 and at the same time closes switch 72b which connects the low $\overline{CS2}$ output to the enabling inputs of both the semiconductor memories 52, 53 such that those memories will operate in parallel.

The high input on the bus control line 76 also disables the switch 70 and thus the data lines of the semiconductor memory devices 52, 53 are individually coupled to the associated buffer circuits 54, 55, rather than being cross-coupled as in the narrow bus mode. Finally, the high input on bus control lines 76 (coupled with the low input on card enable line 61) satisfies the gate 75 which enables the data bus buffer circuit 54 (while the data bus buffer circuit 55 is enabled by the low $\overline{CE}$ signal) and thus data on the entire bus 56 including both the narrow section 57a and the wide section 57b are coupled to respective memory devices 53, 52 at the address locations determined by address signals on bus 60 so that the IC card of FIG. 3 functions in that mode as a 16-bit data bus device.

All that is required to switch the card from its 8- to its 16-bit mode is to change the logic level on the bus control line 76. When the logic level is low, the card functions in the 8-bit mode and high in the 16-bit mode. Thus, both of the semiconductor memories 52, 53 are fully utilized irrespective of the mode, those memories being utilized individually and separately addressable when the card is functioning in the narrow bus 8-bit mode and in parallel to store respective portions of the longer data word when the card is functioning in the wide bus or 16-bit mode.

As noted above, the card enable and bus control signals can be internally generated on the card, or can be controlled directly from the external terminal. In the latter mode when the external terminal is of the 16-bit data bus variety, it simply couples a signal to the IC card which causes a high logic level to be input to bus control line 76 to cause the card to operate as described above in that mode. Similarly, when the card is inserted into an external terminal which is configured for an 8-bit data bus, in addition to applying a logic signal to the card which will drive the $\overline{CE}$ input 61 low, it will also apply a logic level to the BC input 76 which is at a low level to cause the IC card to function in the 8-bit data bus mode.

Figure 4:
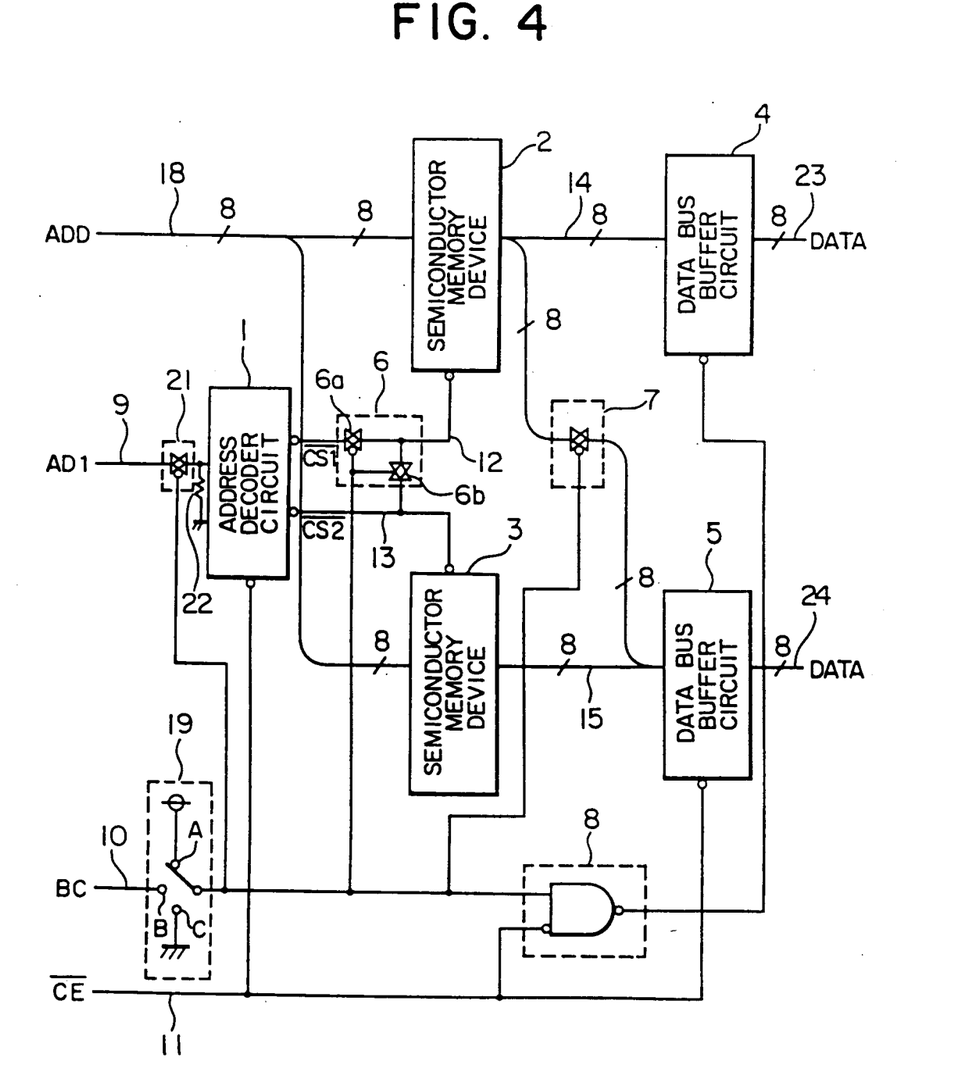
FIG. 4 is a block diagram similar to FIG. 3 but illustrating an alternative means of switching between the N or 2N data bus structure.

A further option in that respect is illustrated in connection with the IC card of FIG. 4 which is identical to that of FIG. 3 except for the circuitry which switches the card between the narrow and wide bus modes. The IC card of FIG. 4 illustrates two options for such switching, one being internal to the IC card illustrated in the form of a manual switch 80 and a second (resulting from one of the multiple positions of the switch 80) being external mode control by way of logic signals BC coupled to signal line 81. Thus, when the switch is in the position illustrated in FIG. 4, the contact A (which in turn is coupled to a high logic source) is closed, which, just as the high logic level on line 76 in the FIG. 3 embodiment, maintains the IC card in the wide bus mode. It is seen that the high signal on line 76a disables the address decoder, switches the switch means 72 into the wide bus mode and opens the switch 70 to maintain the data lines of the semiconductor memories 52, 53 in a separate and parallel wide bus mode. When the switch 80 is switched to an alternate position to close contact C, a low logic signal is continuously applied to the input lines 76a which locally maintains the IC card in the narrow bus mode irrespective of any logic signals received on the mode selector line from the terminal. Finally, when the switch 76a is placed into its intermediate position closing contact B, the IC card then responds to logic signals received from the external terminal to automatically adapt the bus structure to that demanded by the terminal. Thus, it is seen that the bus structure can be both user selectable by means of the internal switch or automatically selectable by means of the external terminal to configure the bus structure as is desired for a particular application.

Figure 5:
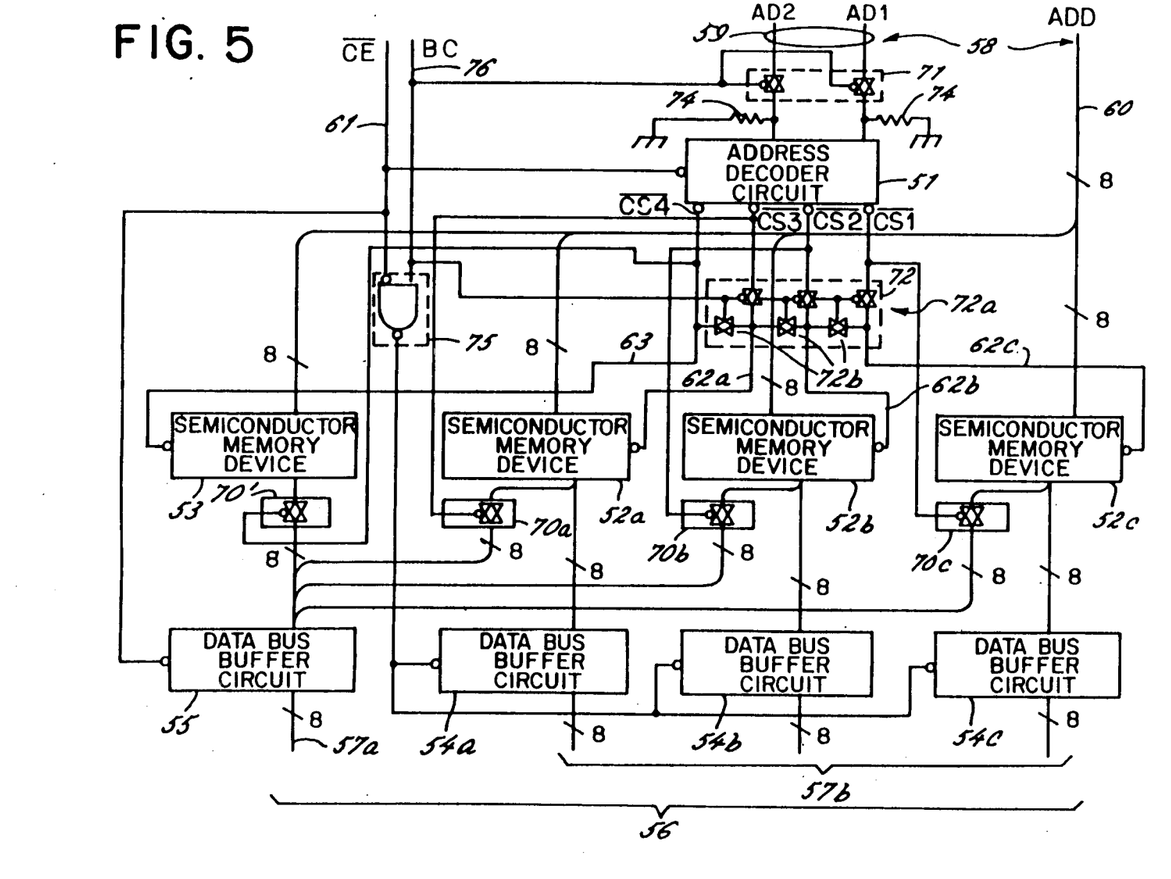
FIG. 5 is a block diagram showing the internal structure of an IC card having a switchable data bus structure between a narrow bus mode of N bits and a wide bus mode of 4N bits.

Turning now to FIG. 5, there is shown a further embodiment of the invention which illustrates a different pair of bus structures for the wide and narrow bus modes. Assuming that the memory devices of the FIG. 5 embodiment are 8-bit devices as in the other embodiments, the system of FIG. 5 illustrates an IC card which has two modes in which the narrow bus mode is an 8-bit mode and the wide bus mode is a 32-bit mode. In the general terms of memories of N bits, the system of FIG. 5 shows an application where the narrow bus mode is of N bits and the wide bus mode of 4N bits.

The structure of the IC card of FIG. 5 will be adequately understood when considering the similarity of reference numerals to those used in FIG. 3 and in view of the following operational description. The card is enabled by a logic low $\overline{CE}$ signal on line 61 just as with the previous embodiments. Similarly, a low logic level BC signal on the bus control line 76 selects the narrow bus mode. However, in contrast to the FIG. 3 embodiment where the narrow bus mode selected between only two memories 53, 52, the narrow bus mode of FIG. 5 can use any of the memories 53, 52a, 52b, 52c individually in the narrow bus mode. To that end, the high order address bus 59 in the FIG. 5 embodiment is comprised of two bits, and the address decoder circuit 51 has four output bits individually driven low in binary fashion in response to the logic levels on lines AD1 and AD2 of the high level address bus 59. As in the previous mode, the low order address bus 60 is coupled to the address lines of all of the semiconductor memories such that the selected memory will respond to address signals to select the addressed word for interchange with the data bus.

The address switching means 72 is configured to have multiple sections in the FIG. 5 embodiment such that when the system is in the narrow bus mode, all of the switches 72a are closed to couple individual ones of the chip select outputs $\overline{CS1}$-$\overline{CS4}$ to the enabling inputs of the associated memories. Similarly, in the wide bus mode, all of the switches 72a are open and all of the switches 72b are closed to couple the $\overline{CS4}$ signal to the enabling input of all of the memories such that all of the memories operate in parallel. It will be appreciated, however, that in the narrow bus mode only one of the semiconductor memories will be enabled at any given time in dependence upon the high order address bits and their decoding by address decoder circuit 51. Thus, whichever of the four outputs is low, that low signal will be coupled through the associated element of switch 72a to enable only the individual one of the selected memory devices for responding to the address signals on low order address bus 60.

In the narrow bus mode, the switches 70a-70c as well as switch 70' selectively connect the respective memories to the single data bus buffer circuit 55 which services the narrow portion of the output bus 57a. The switches 70' and 70a-70c are driven from the address decoder 51 for individual response in connection with the memory selection operation. Thus, the address decoder circuit 51 serves not only to energize a selected one of the semiconductor memory devices for responding to address signals, but also serves to control the output switch to connect the output lines of that memory to the data bus buffer circuit 55 which serves the narrow bus. As a result, and in summary, the low logic level applied to bus control input BC serves to switch the IC card into the narrow bus mode, and the high order address signals on bus 59 select individual ones of the memories. At that time, the selected memory responds to low order address signals on bus 60 to select a particular data word for reading or writing in the addressed word of the selected memory through the narrow portion of the data bus buffer circuit 55.

The IC card of FIG. 5 is switched to the wide bus mode by coupling a high signal onto bus control input 76. In response, the input address switch 71 is opened which renders address decoder circuit 51 unresponsive to the high order address bits and, by virtue of the pull-down resistors 74, switches the $\overline{CS4}$ output low and all other outputs of the address decoder circuit high. All of the switches 72a are open and all of the switches 72b are closed and thus the low signal on the $\overline{CS4}$ output is coupled as an enabling input to each and every one of the semiconductor memories 53 and 52a-52c. Thus, all of the semiconductor memories are enabled to respond to addresses on the low order address bus 60 and such memories will respond in parallel. By virtue of the high BC signal and the low $\overline{CE}$ signal, the gate 75 will be satisfied which in turn will enable all of the data bus buffer circuits 54a-54c while data bus buffer circuit 55 remains enabled by virtue of the low $\overline{CE}$ signal. All of the switches 70a-70c will be open by virtue of the high signals on the associated outputs from address decoder circuit 51 and thus the data lines of the semiconductor memories, in contrast to the interconnecting arrangement of the narrow bus mode, will be individually coupled to the wide portions of the data bus through their associated data bus buffers 54a-54c. Thus, the data on the full output bus 56 which includes the 8 bits of the narrow bus portion 57a as well as the supplemental 24 bits of the wide bus portions 57b will be active and 32-bit data words will be exchanged between the composite semiconductor memory of 32 bits comprising memory devices 53a and 52a-52c and the external data bus 56. As in the previous embodiments, all that is required is the change in logic levels on the bus control line 76 in order to automatically reconfigure the IC card between narrow bus and wide bus modes. Also as in the prior embodiments, all of the semiconductor memories on the IC card can be utilized in both modes, with the memories being utilized independently in the narrow bus mode under the control of address signals coupled to the memories, and in parallel in the wide bus mode also in separately addressable locations such that any of the memories can be utilized in servicing both the narrow bus 57a or its assigned portion of the wide bus 56 in dependence upon the mode selected for the card. That ability coupled with the capability of automatically responding to a logic level from the external terminal to determine the mode in which the card should operate provides extreme flexibility for an IC card of the instant invention.

What is claimed is:

1. In an IC card having an address bus and a data bus for exchanging information with an external terminal, an improved memory structure on the IC card switchable between a narrow bus mode having a narrow data bus of N bits and a wide bus mode having a wide data bus of xN bits (where x is an integer), the improvement comprising the combination of:

a plurality of N bit memories each having address lines and data lines;

address decoder means connected to select inputs of the semiconductor memories for selectively causing the memories to respond to sequential address signals on their address lines together in the wide bus mode or separately in the narrow bus mode;

data bus switching means for controlling the coupling of data signals between the data lines and the narrow or wide bits of the data bus depending on the bus mode; and mode control means in the IC card for determining the bus structure for use with a particular external terminal and enabling the narrow bus mode or wide bus mode in dependence upon the bus structure required for the particular external terminal.

2. The IC card as set forth in claim 1 in which the mode control means includes means for operating the N-bit memories:

(a) in parallel in the wide bus mode to transfer data between the data lines of the N-bit memories and the wide data bus of xN bits; and (b) individually in the narrow bus mode to transfer data between the data lines of an individual one of the N-bit memories and the narrow data bus of N-bits.

3. The IC card as set forth in claim 2 further including sensing means for responding to a logic signal produced by the external terminal for enabling the narrow bus or wide bus mode in dependence upon the logic level received from the external terminal.

4. The IC card as set forth in claim 2 in which the N bit bus is an 8-bit bus and the xN bit bus is a 16-bit bus.

5. In an IC card having an address bus and a data bus for exchanging information with an external terminal, an improved memory structure on the IC card switchable between a narrow bus mode having a narrow data bus of N bits and a wide bus mode having a wide data bus of xN bits (where x is an integer), the improvement comprising the combination of:

a plurality of N bit memories each having address lines and data lines;

means for coupling the address lines of the memories to the address bus;

address decoder means connected to select inputs of the semiconductor memories for enabling said semiconductor memories to operate in parallel in the wide bus mode and individually in the narrow bus mode in dependence upon a high order address signal coupled thereto from the address bus;

data bus buffer means selectively coupling the memory data lines to the data bus and having narrow bus and wide bus operating modes including:
  (a) a narrow bus mode in which the data lines of all of said memories are connected to the same N bits of the narrow data bus, and
  (b) a wide bus mode in which the data lines of the respective memories are connected to separate groups of N bits of the wide data bus, and mode control means for controlling the state of the address decoder means and the data bus buffer means, said mode control means establishing the narrow bus and wide bus modes for said IC card in which:
  (a) the semiconductor memories respond in parallel to exchange data words with the wide bus of xN bits in the wide bus mode and
  (b) the memories are selectively energized in dependence on the high order address signal to individually exchange data words with the N bits of the narrow bus.

6. The IC card as set forth in claim 5 further including sensing means for responding to a logic signal produced by the external terminal for enabling the narrow bus or wide bus mode in dependence on the logic level received from the external terminal.

7. A method of operating an IC card having an address bus and a data bus for exchanging information with an external terminal, said IC card having a switchable data bus including a narrow bus of N bits and a wide bus of xN bits (where x is a positive integer, $x \geq 2$), the method comprising the steps of:

providing a plurality of N-bit memories each having address lines and data lines;

driving the address lines of all of the memories in dependence on signals on the address bus;

decoding at least a high order address bit on said address bus to establish the wide bus mode in one condition or the narrow bus mode in the other condition;

enabling the memories to respond to signals on the address bus (a) together in the wide bus mode, and (b) individually, in dependence on the high order address bit, in the narrow bus mode;

in the narrow bus mode selectively coupling the data lines of the enabled memory to the N bits of the narrow data bus for exchanging information with the external terminal on only the narrow data bus;

in the wide bus mode coupling the data lines of the memories in parallel to the xN bits of the wide data bus for exchanging information between the memories operated in parallel and the external terminal on the wide data bus; and switching between the narrow bus mode and the wide bus mode in dependence upon the bus structure required for the particular external terminal.

8. The method as set forth in claim 7 further including the step of sensing the bus structure of the external terminal, and switching between the narrow bus and wide bus modes in dependence on the bus structure of the particular terminal operating with the IC card.

9. An IC card having a data bus structure of selectable width including a narrow bus mode wherein the data bus is N bits wide and a wide bus mode wherein the data bus is xN bits wide (where x is a positive integer, $x \geq 2$), the IC card comprising, in combination:

means for carrying input/output signals including an address bus, a data bus, a card enable line, and a bus width selector line;

a plurality of N bit memories each having address lines and data lines;

a plurality of N-bit data buffers for selectively connecting the data lines of the semiconductor memories with the data bus;

memory enable means having two modes including:
  (a) a narrow bus mode for selectively addressing one or the other of the N-bit memories at addresses defined by signals coupled to the card on the address bus, and
  (b) a wide bus mode for addressing both memories with the same address coupled to the card on the address bus;

bus buffer switching means having two modes including:
  (a) a narrow bus mode for coupling both memories to the N bits of the narrow data bus, and
  (b) a wide bus mode for coupling the memories to the xN bits of the wide data bus; and switch means responsive to a signal coupled to the IC card defining the bus structure for selectively enabling the narrow bus mode or the wide bus mode to read or write the memories at identified addresses in the defined mode.

* * * * *